(12) United States Patent
Wigboldy et al.

(10) Patent No.: US 12,083,660 B1
(45) Date of Patent: Sep. 10, 2024

(54) WASHER HOLDER ADAPTOR FOR FASTENER GUNS

(71) Applicant: Altenloh, Brinck & Co. US, Inc., Grand Rapids, MI (US)

(72) Inventors: Jason R. Wigboldy, Grand Rapids, MI (US); David A. Boyd, Grand Rapids, MI (US)

(73) Assignee: Altenloh, Brinck & Co. US, Inc., Bryan, OH (US)

(*) Notice: Subject to any disclaimer, the term of this patent is extended or adjusted under 35 U.S.C. 154(b) by 2 days.

(21) Appl. No.: 17/703,660

(22) Filed: Mar. 24, 2022

Related U.S. Application Data

(60) Provisional application No. 63/166,346, filed on Mar. 26, 2021.

(51) Int. Cl.
*B25C 7/00* (2006.01)
*F16B 43/00* (2006.01)

(52) U.S. Cl.
CPC ............... *B25C 7/00* (2013.01); *F16B 43/00* (2013.01)

(58) Field of Classification Search
CPC ......... B25C 5/1693; B25C 1/006; B25C 7/00; F16B 43/00; B23B 2226/33
See application file for complete search history.

(56) References Cited

U.S. PATENT DOCUMENTS

| | | | | |
|---|---|---|---|---|
| 3,558,032 A * | 1/1971 | Oefinger | ................. | B25C 1/087 227/8 |
| 3,786,980 A * | 1/1974 | Passer | ..................... | B25C 1/184 227/120 |
| 4,434,927 A * | 3/1984 | Butler | ..................... | B25C 1/188 411/441 |
| 5,405,071 A * | 4/1995 | Baugus | ................... | B25C 1/047 227/140 |
| 5,484,094 A * | 1/1996 | Gupta | ....................... | B25C 1/18 227/119 |
| 5,687,899 A * | 11/1997 | Dohi | ........................ | B21J 15/18 227/8 |
| 6,145,723 A * | 11/2000 | Gupta | ....................... | B25C 1/08 227/139 |
| 6,820,789 B2 * | 11/2004 | Lipsky | ................... | B25B 23/10 227/8 |
| 6,942,126 B2 * | 9/2005 | Douglas | ................ | B05B 9/0838 239/323 |
| 7,025,641 B2 * | 4/2006 | Nayrac | .................. | B25C 1/005 227/8 |

(Continued)

FOREIGN PATENT DOCUMENTS

JP 2014231136 A * 12/2014

*Primary Examiner* — Joshua G Kotis
(74) *Attorney, Agent, or Firm* — Gardner, Linn, Burkhart & Ondersma LLP

(57) ABSTRACT

An adaptor configured for mounting to a nose stem of a fastener gun, with the adaptor including a flexible elongate body portion that is stretchable over the nose stem of the fastener gun to retain the body portion thereon, and including an end affixed to the body portion, where the end is configured to engage with a mountable building fixture to secure the mountable building fixture to a building surface via a fastener discharged from the fastener gun. The mountable building fixtures may be plastic washers, metallic washers, as well as various plates or hangers, such as joist hangers or truss plates or other such connectors.

20 Claims, 5 Drawing Sheets

(56) References Cited

U.S. PATENT DOCUMENTS

| | | | | |
|---|---|---|---|---|
| 7,354,230 | B2 * | 4/2008 | Bauman | B23B 31/008 |
| | | | | 403/379.5 |
| 7,513,404 | B2 * | 4/2009 | Shkolnikov | B25C 1/008 |
| | | | | 227/8 |
| 8,308,038 | B2 * | 11/2012 | Tanaka | B25C 7/00 |
| | | | | 227/18 |
| 8,413,740 | B2 | 4/2013 | Rodenhouse | |
| 9,309,915 | B1 | 4/2016 | Rodenhouse et al. | |
| 9,631,667 | B2 | 4/2017 | Rodenhouse et al. | |
| 9,989,082 | B2 | 6/2018 | Rodenhouse et al. | |
| 2005/0211744 | A1 * | 9/2005 | Maglione | B25C 1/188 |
| | | | | 227/10 |
| 2008/0308594 | A1 * | 12/2008 | Schettini | B25C 7/00 |
| | | | | 227/110 |
| 2015/0306754 | A1 * | 10/2015 | Pappin | B25C 1/04 |
| | | | | 227/15 |
| 2020/0406438 | A1 * | 12/2020 | Uchiyama | B25C 1/04 |

\* cited by examiner

WASHER HOLDER ADAPTOR FOR FASTENER GUNS

CROSS REFERENCE TO RELATED APPLICATION

The present application claims priority of U.S. provisional patent application Ser. No. 63/166,346, filed on Mar. 26, 2021, which is hereby incorporated herein by reference in its entirety.

BACKGROUND AND FIELD OF THE INVENTION

The present invention is directed to a washer holder adaptor that is mountable to fastener guns, and in particular a washer holder adaptor that is configured for use with both metallic and plastic washers and is mountable to various types of fastener guns.

SUMMARY OF THE INVENTION

The present invention provides a flexible or semi-rigid washer holder adaptor that is securable to a variety of fastener guns, and in particular is securable to differently sized and shaped nose stems of different fastener guns. The washer holder adaptor may then aid in use of securing washers to a building surface using the fastener gun.

These and other objects, advantages, purposes and features of this invention will become apparent upon review of the following specification in conjunction with the drawings.

DESCRIPTION OF THE PREFERRED EMBODIMENTS

Figure 1:
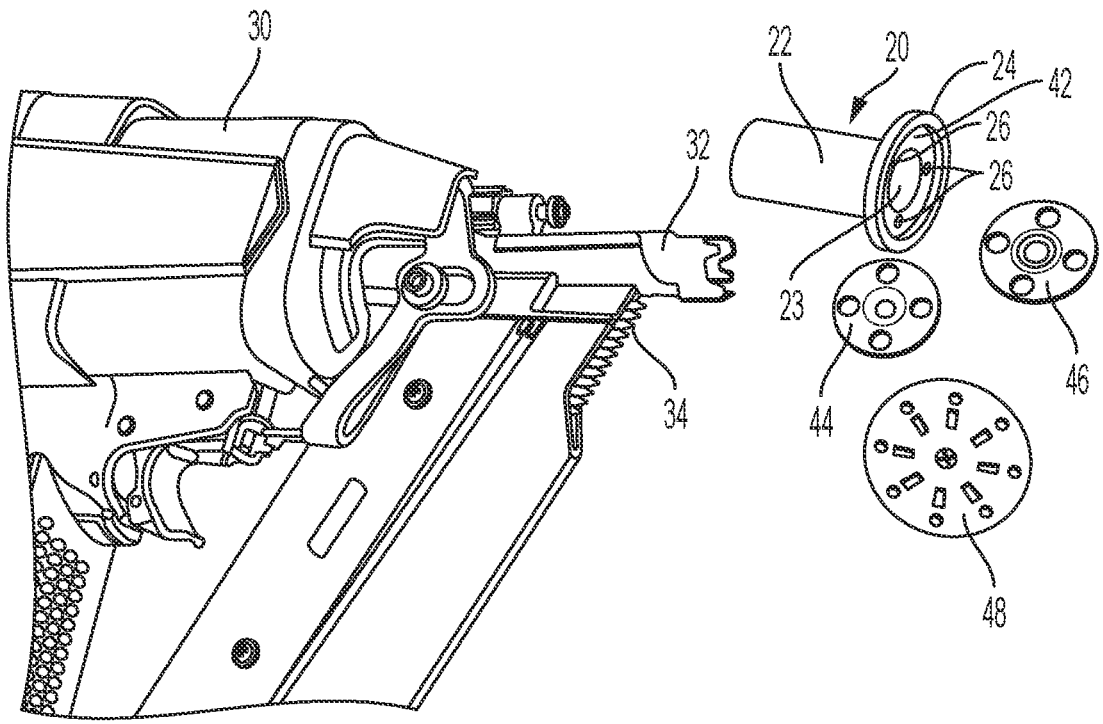
FIG. 1 is a side view of a fastener gun shown with a washer holder adaptor prior to installation to a nose stem of the fastener gun shown in relation to various types of washers.
Figure 2:
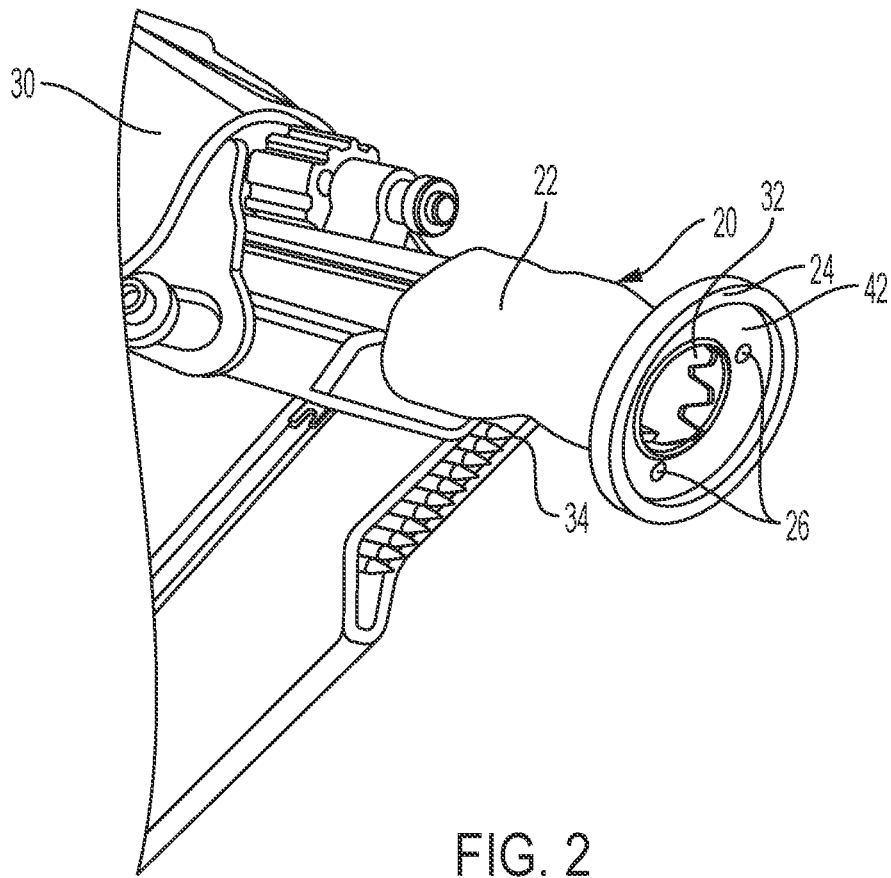
FIG. 2 illustrates the washer holder adaptor mounted to the nose stem of the fastener gun.

The present invention will now be described with reference to the accompanying figures, wherein the numbered elements in the following written description correspond to like-numbered elements in the figures. A washer holder adaptor 20 in accordance with the present invention is illustrated in FIGS. 1-8, where adaptor 20 includes a sleeve portion 22 and a holder end 24 having magnets 26 mounted therein. Adaptor 20 is constructed of a flexible or semi-rigid material whereby adaptor 20 is mountable to nose stems of a wide variety of conventional fastener guns and is useable with either metallic washers via magnets 26 or non-metallic washers for use in affixing fasteners through such washers and to a building surface. As discussed in more detail below, sleeve portion 22 is configured to stretch over nose stems of various fastener guns and be held there in place by the elastic nature of the sleeve portion 22 that forms a snug friction fit to at least a portion of the nose stem.

A conventional fastener gun 30 configured as a nail gun is shown in FIGS. 1-8 and includes a nose stem 32 through which fasteners 34 are discharged. Various makes and models of conventional fastener guns are known, such as fastener guns manufactured and/or distributed by DEW-ALT®, PORTER CABLE®, PASLODE® and SENCO®, where the fastener guns may be configured for use with nails or screws. The nose stems of such fastener guns are operable with safety features of the guns to require the nose stem to be pressed against a building surface prior to a fastener being discharged from the gun. For example, the nose stem may retract toward the fastener gun handle or body upon being pressed against the building surface to thereby releasing the safety of the fastener gun and allowing a fastener to be discharged from the fastener gun. Nose stems of fastener guns distributed by different companies have varying designs and sizes, including in terms of lengths and outer geometries. For example, nose stems of fastener guns may include a generally cylindrical portion having a generally circular outer profile with outer diameters of between 0.625 inches to 1.0 inches.

In the illustrated embodiment, adaptor 20 is constructed of RTV silicone rubber and includes a sleeve portion 22 that is constructed to be generally cylindrical and have a hollow interior passage 23 with an open end 36 opposite holder end 22, with sleeve portion 22 being formed of a rubbery material and having a wall thickness that permits sleeve portion 22 to stretch around and over various diameters and shapes of nose stems for differing fastener guns. That is, sleeve portion 22 is stretchable so as to be expanded by hand by an operator and stretched over the nose stem of the fastener gun, with the sleeve portion 22 then retracting so as to be snug fit on at least a portion of the nose stem 32. That is, the sleeve 22 expands to fit over the nose stem 32 and contracts to be retained against the nose stem 32. When so installed, adaptor 20 is sufficiently retained on the nose stem such that the fastener gun may be used with adaptor 20 installed thereon without adaptor 20 falling off of the nose stem.

Adaptor 20 may alternatively and/or additionally be retained on nose stem 32 via a clamp or clip, such as a clamp or clip made from spring steel. In such a configuration the clamp or clip is designed to press and retain sleeve 22 against nose stem 32 of fastener gun 30, with the clamp or clip being placed on the outside of sleeve 22 to squeeze the sleeve 22 against the nose stem 32. For example, in FIG. 9 the two legs or ends 25a, 25b of a C-shaped clip or clamp 25 are shown pressing sleeve 22 against nose stem 32 from opposing sides of nose stem 32.

The illustrated adaptor 20 is approximately two inches in total length with the sleeve portion 22 having in the un-stretched state an outer diameter of approximately 0.875 inches and an inner diameter of approximately 0.625 inches, and with the holder end having a diameter of approximately 1.375 inches. It should be appreciated, however, that adaptor 20 may be constructed of different sizes and or different materials. For example, adaptor 20 may be constructed with a longer length than two inches, and in particular with a longer sleeve portion 22 with the length of the sleeve portion intended to be trimmed to a desired length for a given application. That is, the sleeve portion 22 would be trimmed at the open end 36 so as to remove a circumferential segment.

In the illustrated embodiment sleeve portion 22 is integrally formed with holder end 24, such as being simultaneously molded. Sleeve portion 22 and holder end 24 may be molded or formed from the same material, such as in a unitary molding process. Still further, in a particular embodiment sleeve portion 22 and holder end 24 may be made from different materials, including materials with different durometers. This includes still being unitarily formed. For example, adaptor 20 may be made in a two shot molding process with a first material that is more stretchable or flexible being used for the sleeve portion, and a second material being used for the holder end 24 that is less stretchable or flexible, or in other words more rigid.

As shown, holder end 24 forms a receptacle or recessed cup shape 38 defined by a circumferential outer raised ring or wall 40 and a base 42, with wall 40 extending from and surrounding base 42. Magnets 26 are embedded within base 42, such as during a molding process or being inserted after molding. Magnets 26 of receptacle 38 may be used to temporarily hold ferrous washers of various sizes, such as washers 44, 46 shown in FIGS. 1 and 3, with ring 40 aiding in centering the washer on the holder end 24. A metallic washer thus held by holder end 24 is then secured to a building surface by a fastener discharged via fastener gun 30. For example, an operator may initially place a metallic washer 44 or 46 within the receptacle 38 to temporarily retain the washer therein. The operator may then press the adaptor 20 and nose stem 32 against the building surface to enable a fastener 34 to be discharged, where the fastener 34 then secures the washer to the building surface.

Still further, adaptor 20 may also be used to aid in mounting other metallic building materials other than washers. For example, various plates or hangers, such as joist hangers or truss plates or other such connectors, may be magnetically retained to a fastener gun via adaptor 20 prior to being secured to a building surface via a fastener discharged from the fastener gun. It should be appreciated that a building surface may entail any of a number of surfaces, including but not limited to a wall, a joist, a board, a panel or other such building material. Still further, it should additionally be appreciated that alternative adaptors may be employed, such as with differently configured holder ends, and still operate in accordance with the present invention. For example, the alternative holder end may still employ magnets for retaining a metallic building material.

As noted, adaptor 20 may alternatively be used with non-metallic washers, such as a plastic washer. In one configuration a plastic washer may be provided that is retained via a friction fit with ring 40 of holder end 24 so as to be retained within receptacle 38. In like manner to the above description regarding the metallic washer, an operator may place such a washer within the receptacle 38 with adaptor 20 mounted to the nose stem 32 of the fastener gun 30 and subsequently place the holder end 24 with the washer against a building surface and activate the fastener gun 30 to discharge a fastener 34 through the washer whereby the washer is secured to the building surface.

The plastic washers, metallic washers and other components, such as metallic plates and hangers noted herein, thus comprise mountable building fixtures that may be engaged by adaptor 20 during assembly.

Alternatively, plastic washers, such as a washer 48 shown in FIGS. 1 and 3, may be pre-spotted or pre-placed on a building surface with adaptor 20 mounted to a fastener gun 30 subsequently used to aid in the driving of fasteners 34 through the plastic washers. For example, such plastic washers may be provided with one or more prongs that may be pressed into a building material, such as washers constructed in accordance with the disclosure of U.S. Pat. Nos. 9,309,915 and/or 9,631,667, which are incorporated herein by reference in their entireties. Subsequent to the washers being preplaced onto the building surface, adaptor 20 mounted to a fastener gun 30 may be used to center the fastener gun 30, and in particular center the nose stem 32, relative to the washer for driving a fastener 34 through the washer and securing it to the building surface. For example, the outer ring 40 of the holder end 24 may be used to interface with features on such a plastic washer to aid in centering the nose stem 32 relative to the washer.

Figure 9:
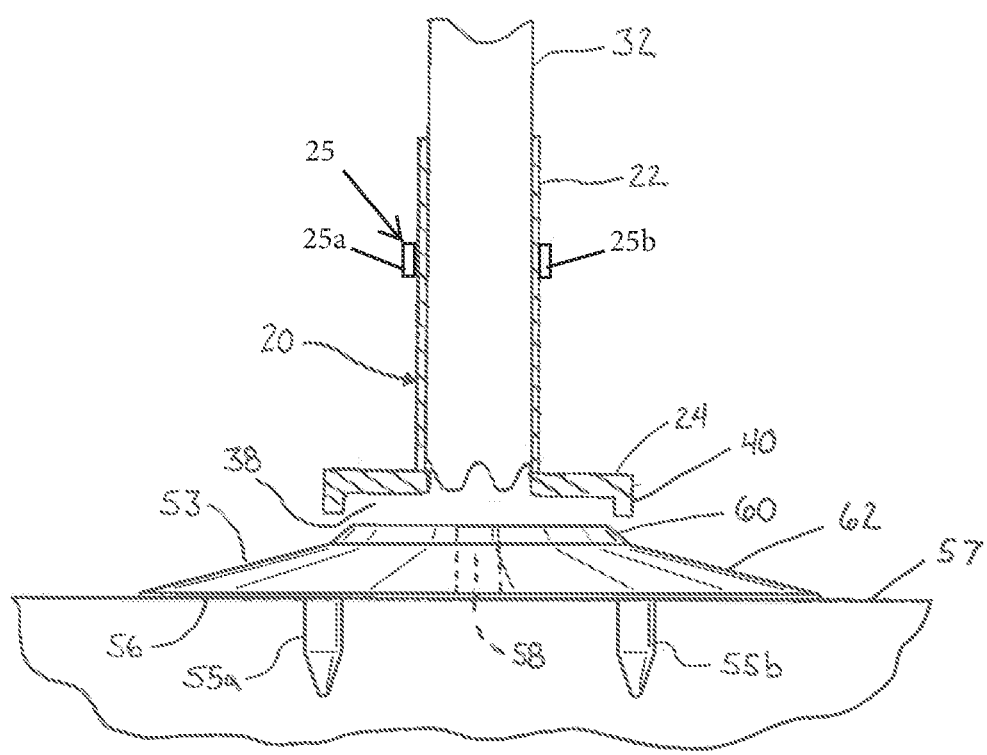
FIG. 9 is a side view of a washer holder adaptor engaging with a pre-spotted plastic washer having prongs that has been placed onto a building surface with the adaptor being used to locate onto the washer to enable a fastener to be driven through a through hole of the washer.

In the embodiment of FIG. 9, washer adaptor 40 is disposed on nose stem 32 in relation to plastic washer 53 that is pressed into the surface of a building material 57, such as into rigid foam insulation. Washer 53 includes a pair of arms or prongs 55a. 55b extending or projecting from backside or underside 56 of washer 53, as well as a central aperture 58 for receiving a fastener 34. Washer 53 further includes an engagement portion or member, which in the illustrated embodiment comprises a protuberance or projection or protrusion member 60 on or extending from the top surface 62 of washer 53, where protrusion member 60 aids in locating or positioning a fastener gun 30 on washer 53 via washer adaptor 20 for aligning and driving a fastener 34 through washer 53. Washer adaptor 20 is shown in cross section in FIG. 8, where adaptor 20 is affixed to nose stem 32 via the stretched attachment of sleeve 22 to stem 32. As discussed above, adaptor 20 includes receptacle 38 that is sized with protrusion member 60 for locating adaptor 20 on washer 53, where receptacle 38 is configured to receive or mate with protrusion member 60 whereby a fastener 34 driven by the fastener gun 30 to which adaptor 20 is affixed will be driven into aperture 58 of washer 53. Adaptor 40 thus is operable to align the fastener gun 30 and nose stem 32 with washer 53, and in particular with aperture 58 in washer 53, where protrusion member 60 aids in aligning the fastener gun via adaptor 40, and specifically the fastener driven from the gun, with aperture 58 of washer 53.

Figure 3:
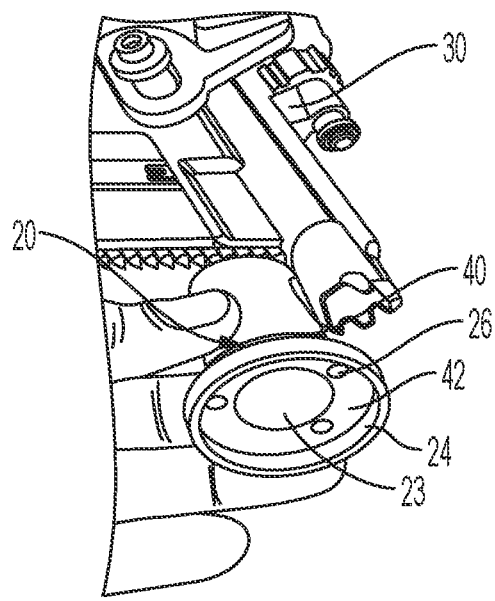
FIGS. 3-6 illustrate the fitting and mounting of the washer holder adaptor to a nose stem of a fastener gun.
Figure 4:
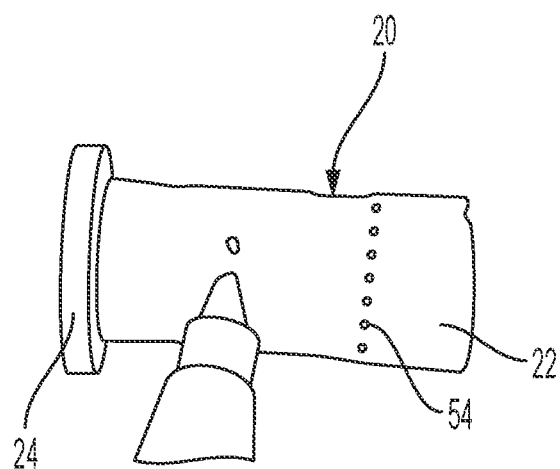
Figure 5:
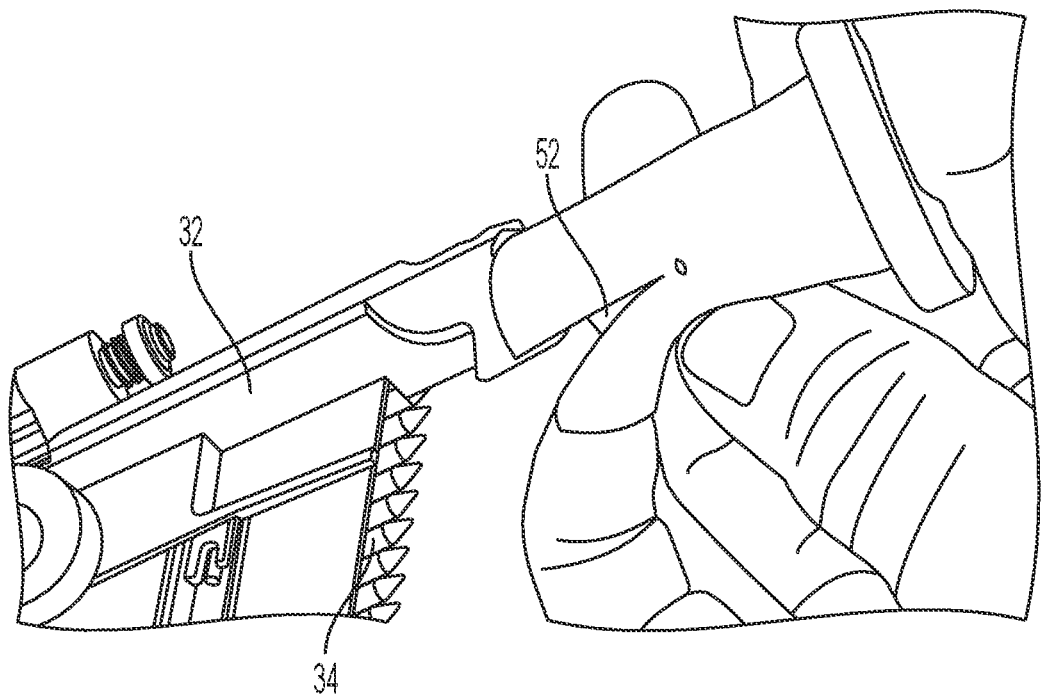
Figure 6:
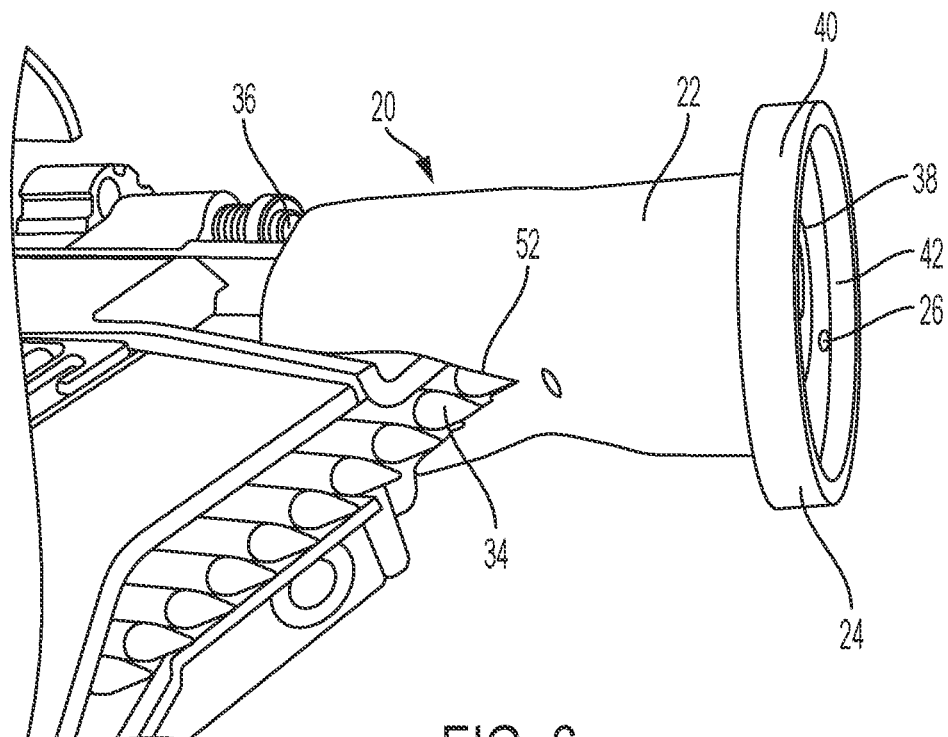
Figure 7:
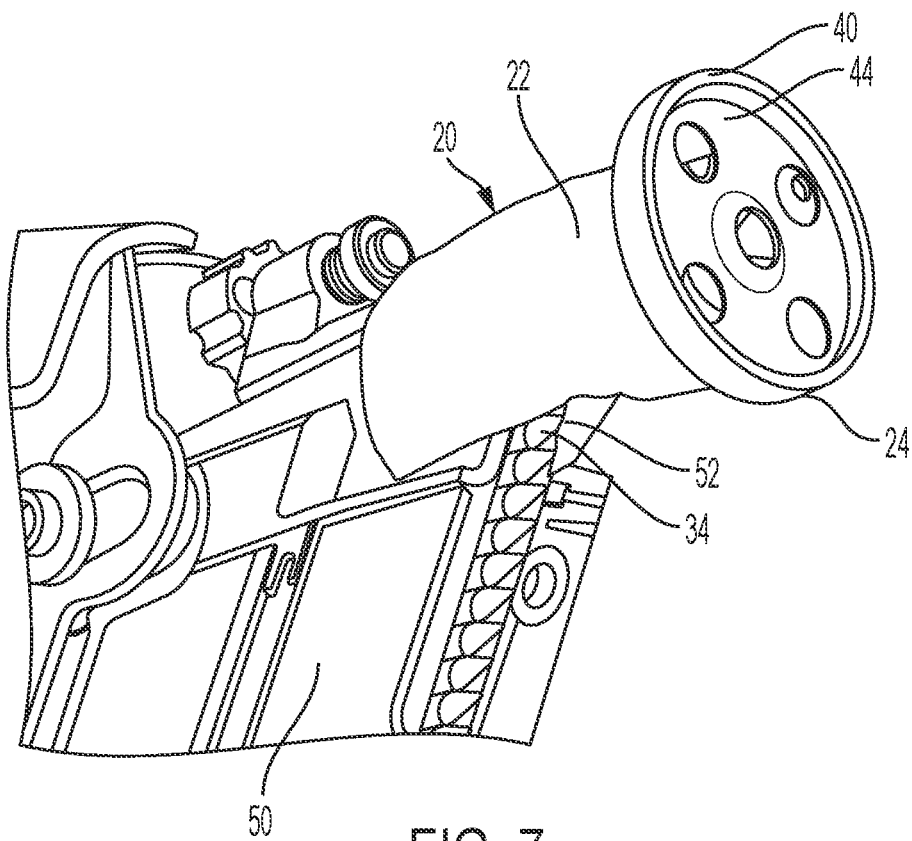
FIG. 7 is a front perspective view illustrating a washer holder adaptor mounted to a nose stem and holding a metallic washer.
Figure 8:
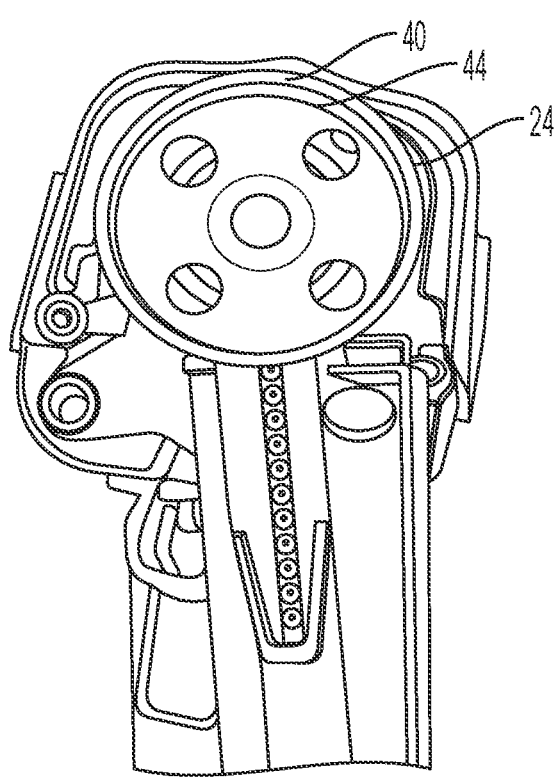
FIG. 8 is an end view of the washer holder adaptor mounted to the fastener gun and holding a metallic washer of FIG. 7.

FIGS. 3-6 illustrate an exemplary method of fitting and mounting a washer holder adaptor 20 to a nose stem 32 of a fastener gun 30 in accordance with the present invention. As shown in FIG. 3, the adaptor 20 is initially positioned relative to the fastener magazine 50 of nose stem 32, with a mark being placed on the sleeve 22 as shown in FIG. 4. A slit 52 (FIG. 5) is then formed in sleeve 22 so that sleeve may be positioned past magazine 50 with the holder end 24 disposed generally flush with the end of the nose stem 32 (FIG. 6). FIGS. 6 and 7 likewise illustrate that slit 52 enables collated fasteners 34 within magazine 50 to advance toward nose stem 32. Alternatively and/or additionally, washer adaptor 20 may be sized via perforations on sleeve 22, such as perforations 54 shown in FIG. 4. In the embodiment of FIG. 4, the length of sleeve 22 may be adjusted by an operator tearing or ripping sleeve along perforations 54 to obtain the desired length of sleeve 22. It should be appreciated that sleeve 22 may be provided with perforations circumferentially about sleeve 22 and/or may be provided with perforations at differing distances from end 24 to enable selective lengths of sleeve 22 to be set. Still further, such perforations may be provided longitudinally along sleeve 22 to enable a slit 52 to be formed. It should further be appreciated that sleeve 22 may be trimmed in length via a knife or scissors. Thus, sleeve 22 is adjustable in length.

Although adaptor 20 is disclosed and discussed herein as enabling fastener guns, such as fastener gun 30, to be used with a washer, such as washers 44, 46 and 48, it should be appreciated that the fastener guns may be used with an adaptor 20 thereon without washers. In which case, adaptor 20 may remain secured to the nose stem 32 while fastener gun 30 is used to drive fasteners 34 into the building materials independently of a washer. In such a configuration, as noted above, the end of the nose stem 32 is positioned at or adjacent the holder end 24. It should also be appreciated that the present invention is operable with various fastener guns and associated fasteners, such as fastener guns for screws, nails, pins and the like.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An adaptor configured for mounting to a nose stem of a fastener gun, said adaptor comprising:
   an elongate body portion comprising a wall defining a longitudinally extending sleeve portion, wherein the wall is flexible and configured to stretch to have an inner diameter greater than one inch to fit over differently sized and shaped nose stems of different fastener guns and to then contract the inner diameter down to as small as 0.625 inches to conform to the different sizes and shapes of the nose stems to retain the body portion on such different nose stems; and
   an end affixed to the body portion, wherein said end is configured to engage and retain a mountable building fixture to secure the mountable building fixture to a building surface via a fastener discharged from the fastener gun.

2. The adaptor of claim 1, wherein the body portion is cylindrical.

3. The adaptor of claim 1, wherein the end includes at least one magnet.

4. The adaptor of claim 1, wherein the body portion and the end are unitarily formed.

5. The adaptor of claim 1, wherein the body portion and the end are formed from different materials.

6. The adaptor of claim 1, wherein the end includes an outer rim.

7. The adaptor of claim 6, wherein the end comprises a receptacle.

8. The adaptor of claim 1, wherein the mountable building fixture comprises a metallic washer or a plastic washer.

9. The adaptor of claim 1, wherein the body portion has a longitudinal length, and wherein the longitudinal length of the body portion is adjustable.

10. The adaptor of claim 9, wherein the longitudinal length of the body portion is configured to be adjusted by removal of a portion of the body portion opposite said end.

11. A method of mounting an adaptor to a fastener gun, said method comprising:
    providing an adaptor having an elongate body portion and an end affixed to the body portion, wherein the body portion comprises a wall defining a longitudinally extending sleeve portion, wherein the sleeve portion is flexible and configured to stretch to have an inner diameter greater than one inch to fit over differently sized and shaped nose stems of different fastener guns and to then contract the inner diameter down to as small as 0.625 inches to conform to the different sizes and shapes of the nose stems to retain the body portion on such different nose stems, and wherein said end is configured to engage and retain a mountable building fixture to secure the mountable building fixture to a building surface via a fastener discharged from a fastener gun; and
    stretching the wall over a nose stem of the fastener gun and allowing the wall to contract to conform to the size and shape of the nose stem to retain the body portion thereon.

12. The method of claim 11, further comprising shortening a length of the body portion by removing material from the body portion opposite said end.

13. The method of claim 11, further comprising forming a slit in the body portion and wherein said stretching the body portion over a nose stem of the fastener gun further comprises positioning the slit at a magazine of the fastener gun.

14. The method of claim 11, further comprising securing a clip or clamp over the body portion after said stretching the body portion over the nose stem of the fastener gun, wherein the clip or clamp presses the body portion to the nose stem.

15. An adaptor configured for mounting to a nose stem of a fastener gun, said adaptor comprising:
    an elongate cylindrical body portion comprising a wall defining a longitudinally extending circumferential sleeve portion, wherein the wall is flexible so as to be stretchable over differently sized and shaped nose stems of different fastener guns and to then contract to conform to the different sizes and shapes of the different nose stems to retain the body portion thereon; and
    a holder end affixed to the body portion, wherein said holder end extends radially outward relative to said body portion and is configured to be adjacent an end of the nose stem of the fastener gun when said adaptor is mounted thereto;
    wherein the body portion comprises perforations and includes a longitudinal length, and wherein the longitudinal length of the body portion is configured to be selectively adjustable by removal of a portion of the body portion along the perforations.

16. The adaptor of claim 15, wherein said holder end includes an outer rim defining a receptacle.

17. The adaptor of claim 16, wherein said holder end includes a base, and wherein at least one magnet is disposed at said base.

18. The adaptor of claim 15, wherein the longitudinal length of the body portion is configured to be selectively adjustable by tearing or ripping or cutting along the perforations.

19. The adaptor of claim 15, wherein the body portion and the holder end are unitarily formed.

20. The adaptor of claim 15, wherein the body portion and the holder end are formed from different materials.

* * * * *